United States Patent
Lucarini et al.

(10) Patent No.: US 6,810,594 B2
(45) Date of Patent: Nov. 2, 2004

(54) ASTRONOMICAL, PARTICULARLY SOLAR AND/OR LUNAR, GONIOMETRIC INDICATOR

(75) Inventors: Cesare Lucarini, Rome (IT); Mario Catamo, Rome (IT)

(73) Assignee: Universita' Degli Studi Di Roma "La Sapienza", Rome (IT)

( * ) Notice: Subject to any disclaimer, the term of this patent is extended or adjusted under 35 U.S.C. 154(b) by 0 days.

(21) Appl. No.: 10/469,776
(22) PCT Filed: Mar. 5, 2002
(86) PCT No.: PCT/IT02/00140
§ 371 (c)(1), (2), (4) Date: Sep. 4, 2003
(87) PCT Pub. No.: WO02/070990
PCT Pub. Date: Sep. 12, 2002

(65) Prior Publication Data
US 2004/0078988 A1 Apr. 29, 2004

(30) Foreign Application Priority Data
Mar. 5, 2001 (IT) .................................... RM2001A0116

(51) Int. Cl.[7] .............................................. G04B 49/00
(52) U.S. Cl. ........................................................ 33/270
(58) Field of Search .................................. 33/270, 1 SC, 33/1 SD (56) References Cited

U.S. PATENT DOCUMENTS

| | | | |
|---|---|---|---|
| 3,052,986 A | | 9/1962 | Merchant |
| 3,786,570 A | * | 1/1974 | Davies ......................... 33/270 |
| 4,081,911 A | * | 4/1978 | Eldridge ...................... 33/270 |
| 4,102,054 A | * | 7/1978 | Lewis .......................... 33/270 |
| 4,138,826 A | | 2/1979 | Inge |
| 4,373,270 A | * | 2/1983 | Ousley ......................... 33/270 |
| 4,645,354 A | * | 2/1987 | Mercer ......................... 33/270 |
| 6,072,551 A | * | 6/2000 | Jannson et al. ............... 349/64 |
| 6,604,290 B1 | * | 8/2003 | Hughes, Jr. .................. 33/270 |

\* cited by examiner

Primary Examiner—Christopher W. Fulton
(74) Attorney, Agent, or Firm—Young & Thompson (57) ABSTRACT

An astronomical, particularly solar and/or lunar, goniometric indicator comprising a reflecting member (1; 16; 20) having at least one planar surface scored with substantially circular and concentric microgrooves, wherein the width and the depth of each microgroove and the distance between adjacent microgrooves are adapted to let a diametral line of diffracted and/or reflected light appear when the at least one planar surface is illuminated by a light source, the reflecting member (1; 16; 20) having at least one orientation line (2, 17) that is radial with respect to the microgrooves.

30 Claims, 7 Drawing Sheets

ASTRONOMICAL, PARTICULARLY SOLAR AND/OR LUNAR, GONIOMETRIC INDICATOR

This invention relates to an astronomical, particularly solar and/or lunar, goniometric indicator designed to detect the astronomical co-ordinates of the Sun and/or the Moon and/or to provide information about time and/or position and/or intensity or intensity index of UV radiation based upon such detections, such indicator being simple, accurate, not expensive, not cumbersome and consequently easily movable.

The detection of the astronomical co-ordinates of a star or a planet, such as the Sun or the Moon, is indispensable for performing all these human activities that are connected with the position of the star itself. By way of example, not by way of limitation, agriculture and navigation activities have to always take the position of the Sun or of the Moon with respect to the Earth into account. Furthermore, in day-time, all human activities are clocked by time rolling away, which, in turn, is clocked by the Sun or Moon running through the sky.

In the following description, the astronomical goniometric indicator according to this invention will be illustrated by mainly referring to the Sun, but only by way of illustration, not by way of limitation, and it should be understood that those skilled in the art can readily modify the described indicator so as to enable similar applications to be conceived in connection with the Moon.

The three astronomical co-ordinates of the Sun that are detected with respect to the earth are: azimuth (preferably with respect to geographic South), the time angle in the equatorial plane and the altitude of the Sun.

Since very ancient times, men realised instruments, such as sun-dials, for instance, adapted to indicate the time and/or the position based upon the position of the Sun with respect to the earth. A sun-dial is a solar clock comprising an member (generally a rod), so-called gnomon, which project its own shadow or a light spot upon a suitably graduated and oriented surface.

Another instrument, known since ancient times, for detecting the position of the Sun is the sextant, as used mainly for navigation purposes.

The sextant itself, however, has certain drawbacks substantially connected with employment complexities.

Many instrument presently exist in which use is made of optics, electronics and telecommunications for detecting and/or supplying data related to astronomical co-ordinates of the Sun (and of the Moon) or depending thereon, such as the day time.

Anyhow, in many applications such as non-professional activities, it has been found that such instruments are expensive and/or complex.

In their papers "Come ombra la luce: orologi solari senza gnomone", Astronomia, no. 5, September–October 1999, pages 3–6, and "Light as Shadow, sun-dials without gnomon", The Compendium, Vol. 6, no. 3, September 1999, the inventors disclosed some interesting applications of a Compact Disc or CD, as a solar azimuthal clock, a solar equatorial clock, and a solar altitude clock. In fact, the inventors have shown that the diffraction phenomena occurring on the surface of a CD provided with microgrooves, when it is exposed to the Sun light, cause a thin diametral line of light that can be utilised for detecting the solar coordinates, by suitably orienting the CD and by observing it in right angle direction in a position corresponding to its centre point.

In particular, by providing a CD with a graduated scale having a radial master line and by orienting said CD such that said line is pointed to the geographical South, the indication of the Sun azimuth from the South is furnished by the angle included between said line and the diametral line of light, corresponding to the intersection of the surface of the concerned CD with the vertical plane passing through the Sun and the centre point of said CD. In this case, the CD operates as a solar azimuthal clock and can also be adapted to operate as a solar compass.

In similar way, by positioning the CD on the equatorial plane, namely slanted on the horizon by an angle equal to the co-latitude of the observation locus, and by orienting it toward South, the indication of the time angle of the Sun from South is furnished by the angle included between the South line and the diametral line of light, corresponding to the intersection of the time plane of the Sun passing through the centre point of the CD with the surface of said CD. In this case, the concerned CD operates as an equatorial solar clock and can also be adapted to operate as a solar compass.

Lastly, by positioning the CD in the vertical plane of the Sun, the diametral line of light indicates the altitude of the Sun. This case, the CD operates as an altitude based solar clock and can also be adapted to operate as an elapsed time indicator.

Anyway, the instruments disclosed in the above mentioned papers by the inventors have some shortcomings.

In the first place, the both the solar azimuthal clock and the solar altitude clock have some reading difficulties, due to the fact that the graduated scales which they are provided with include a high number of high density gathered indicator lines, as required in order to keep the position variance of the line of light in the course of the year into account.

Besides that, such instruments furnish information only in respect of the time, the altitude and the azimuth of the Sun.

The solution proposed by this invention is to be considered in this context and it is aimed at overcoming all above mentioned shortcomings.

It is an object of this invention to provide an instrument adapted to detect in simple, accurate and readily readable manner the astronomical co-ordinates of the Sun and/or of the Moon and/or to provide information about time and/or position and/or intensity or intensity index of UV radiation based upon such detection.

It is a further object of this invention to provide an instrument of the above kind, which is not expensive and adapted to be realised as a portable instrument.

It is, therefore, specific subject-matter of this invention an astronomical, particularly solar and/or lunar, goniometric indicator comprising a reflecting member and an indicating member, the reflecting member having at least one planar surface scored with substantially circular and concentric microgrooves, wherein the width and the depth of each microgroove and the distance between adjacent microgrooves are adapted to let a diametral line of diffracted and/or reflected light appear when said at least one planar surface is illuminated by a light source, the reflecting member having at least one orientation graphic sign, the indicating member including at least one graduated scale.

Also according to this invention, the microgrooves can form a planar coil or concentric circumferences.

Again according to this invention, said at least one orientation graphic sign is a line which is radial with respect to the microgrooves.

Preferably according to this invention, the reflecting member and the indicating member are incorporated in a single body. In such a case, at least one planar surface of said reflecting member can be metallised. Always in case of reflecting member and the indicating member incorporated in a single body, said at least one graduated scale may be placed on at least one corresponding planar surface of the reflecting member.

Alternatively according to this invention, the reflecting member may be transparent and may be pivoted on the indicating member. In such a case, said at least one orientation graphic sign may be a circle.

Further according to this invention, said at least one graduated scale comprising angular values and/or time values.

Again according to this invention, said astronomical goniometric indicator can be a solar goniometric indicator and said at least one graduated scale can include one or more curvilinear sectors subdivided into one or more circular sectors.

Still according to this invention, each of said circular sectors can indicate a period of the year, preferably a month of the year.

Preferably according to this invention, said at least one graduated scale includes six circular sectors indicating months of the year.

Further according to this invention, each of said curvilinear sectors can indicate a number of hours to the sunset.

Again according to this invention, each of said curvilinear sectors can indicate an intensity value or an intensity index of the UV solar radiation.

Preferably according to this invention, said reflecting member is a disc, even more preferably a Compact Disc (CD).

Still according to this invention, said reflecting member can be substantially a parallelepiped, preferably a cube, and each of its six sides has a graduated scale.

Further according to this invention, each side of said parallelepiped can include a graduated scale comprising two circular sectors each of which indicates a month of the year.

Further according to this invention, said astronomical goniometric indicator can further comprise a magnetic rod that is freely rotating when it is exposed to the magnetic field of the Earth. Such indicator, therefore, is self-orienting.

Still according to this invention, said astronomical goniometric indicator can include a graduated scale for detection of the magnetic declination of the Earth.

Still according to this invention, said reflecting member can be a disc including a metallised surface and a nonmetallised surface, the latter having said magnetic rod rigidly connected thereto along a diameter of said reflecting member.

Further according to this invention, said astronomical goniometric indicator can further comprise at least one reading amplifier having a stationary member and a movable member pivotally associated thereto, said stationary member having a semicircular graduated scale whose centre point coincides with the pivotal axis, said movable member having a graduated scale extending along a circumference arc as well as mechanical guide means adapted to be coupled to said reflecting member so as to let it move along a circumference arc corresponding to the graduated scale of said movable member.

Preferably according to this invention, the graduated scale of said movable member has a radius equal to 1 m and a width equal to 15°.

Still according to this invention, said mechanical guide means include a circumference arc shaped slot adapted to receive a pin rigidly connected to said reflecting member.

Still according to this invention, said astronomical goniometric indicator can further comprise optical detector means rigidly connected to said reflecting member and adapted to detect a light signal generated by at least one planar metallised surface and to furnish the detected light signal to electronic control and processor means, said electronic control and processor means being connected to display means.

Further according to this invention, the astronomical goniometric indicator can further comprise first electromechanical means controlled by said electronic control and processor means, adapted to rotate said movable member with respect to said stationary member, as well as second electromechanical means controlled by said electronic control and processor means, adapted to move said reflecting member along the circumference arc allowed by said mechanical guide means.

Still according to this invention, said astronomical goniometric indicator can further comprises electronic clock means adapted to furnish a clock signal to said electronic control and processor means.

Again according to this invention, said astronomical goniometric indicator can also comprise further light intensity detector means coupled to said electronic control and processor means.

This invention will be now described, by way of illustration, not by way of limitation, according to its preferred embodiments, by particularly referring to the Figures of the annexed drawings.

Figure 1:
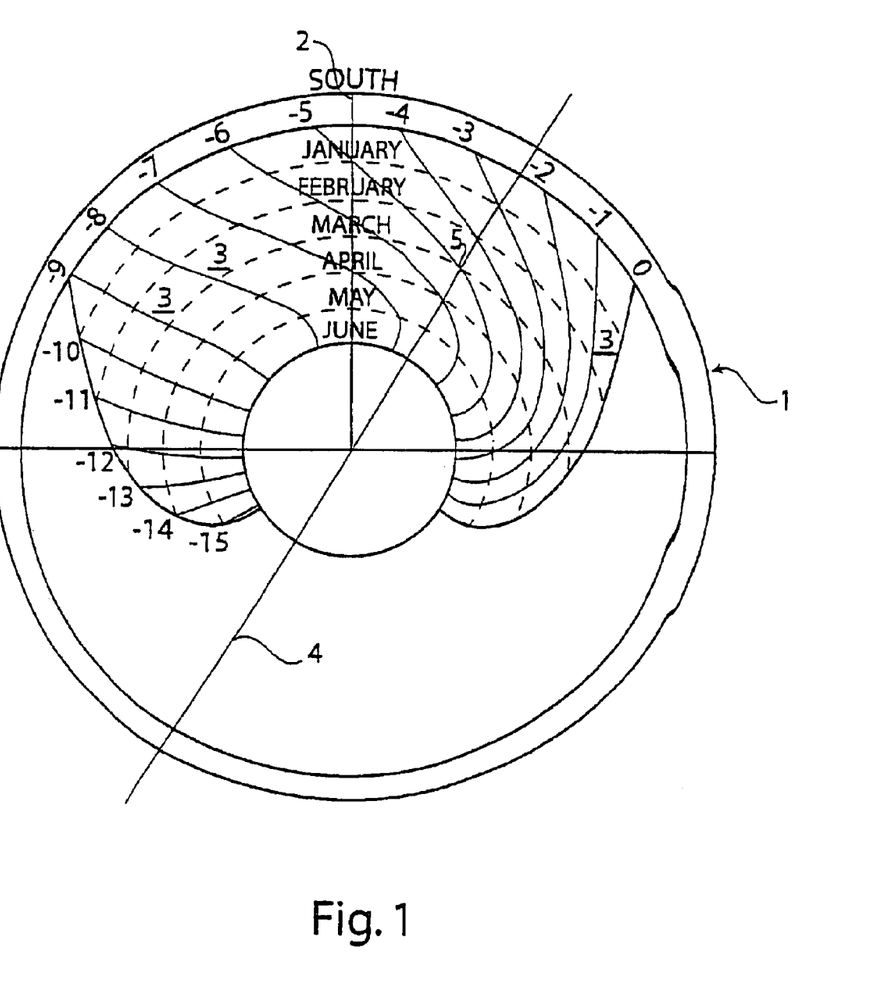
FIG. 1 shows a preferred embodiment of the astronomical goniometric indicator according to this invention.

By referring now to FIG. 1, it can be observed that a preferred embodiment of the astronomical goniometric indicator 1 according to this invention comprises a Compact Disc CD provided with a graduated scale including:
 a radial line 2 that is intended to be oriented toward the geographical South (or, even, in view of the circular symmetry of the indicator, toward the geographical North); and
 a set of curvilinear sectors 3, defined by continuous lines, indicating the number of hours to the sunset (by referring to Rome latitude), subdivided into circular sectors, defined by dashed concentrical circular lines, indicating the month of the year corresponding to the detection (the first six months of the year are shown in FIG. 1).

Preferably, the CD is provided with microgrooves each having a width in the range of 0.1 $\mu$m to 2 $\mu$m and depth in the range of 0.01 $\mu$m to 1 $\mu$m, the spacing between two adjacent microgrooves being in the range of 1 $\mu$m to 20 $\mu$m. More preferably, each microgroove has a width in the range of 0.4 $\mu$m to 0.6 $\mu$m and a depth in the range of 0.07 $\mu$m to 0.2 $\mu$m, the spacing between two adjacent microgrooves being in the range of 1.3$\mu$m to 1.8 $\mu$m.

The reading operation of the number of hours to the sunset is carried out as follows:

the CD is to be exposed to the Sun light oriented with its line 2 aligned with the geographical South direction;

then the circular sector corresponding to the month in which the detection is made should be identified, let us suppose it is the 1$^{st}$ April;

the intersection of diametral line of light 4 formed by the Sun should be located: in the exemplary situation of FIG. 1, such intersection is furnished by point 5;

the reading of curvilinear sector 3 corresponding to such intersection furnishes the number of hours to the sunset, such number being equal to 5 in the Example of FIG. 1.

It is immediately apparent that the indicator of FIG. 1 can be promptly and easily read, which could be extremely useful, for instance, for tourists who need to know how many day light hours are still available to the sunset.

Figure 2:
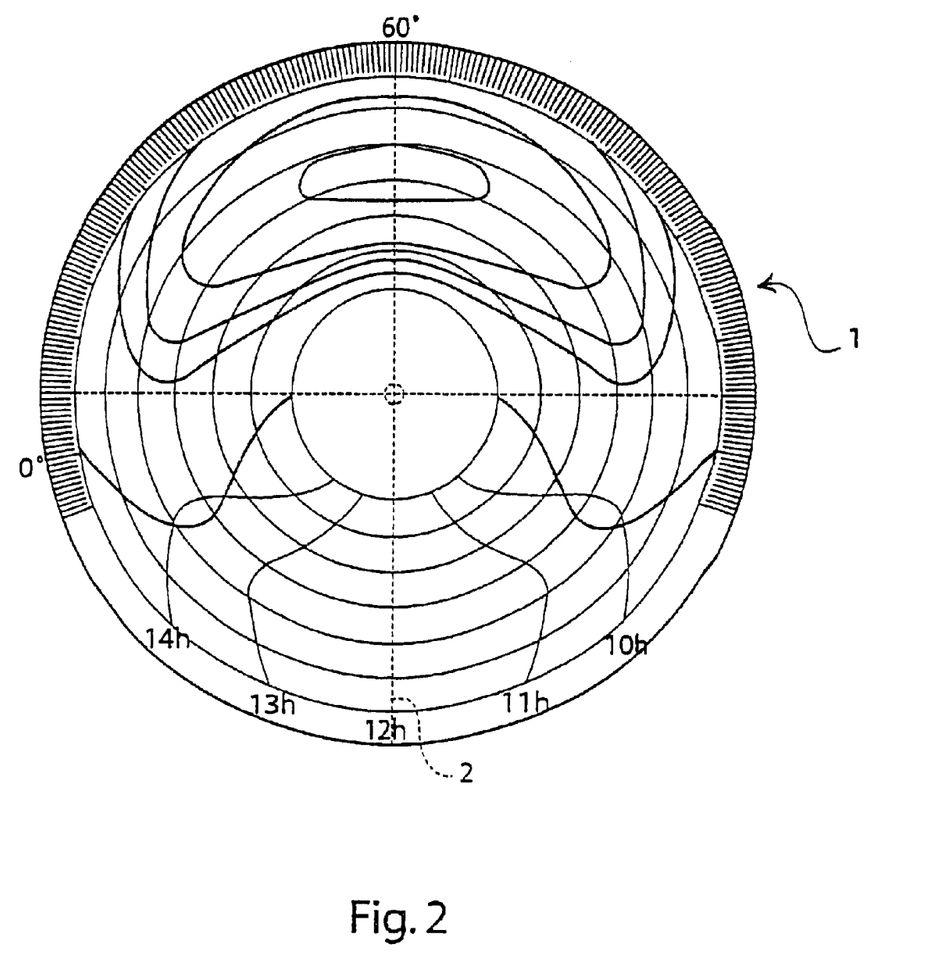
FIG. 2 shows a further preferred embodiment of the astronomical goniometric indicator according to this invention.

A further preferred embodiment of the solar goniometric indicator according to this invention is shown in FIG. 2, such indicator comprising a CD provided with a graduated scale including:

a radial line 2, that is intended to be oriented toward the geographical South; and a set of curvilinear sectors indicating an intensity index of the solar UV radiation.

Figure 3:
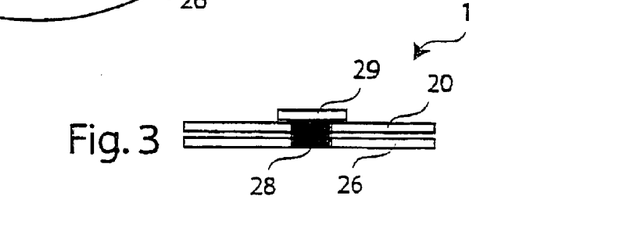
FIG. 3 shows a side view of a still another preferred embodiment of the astronomical goniometric indicator according to this invention.
Figure 4:
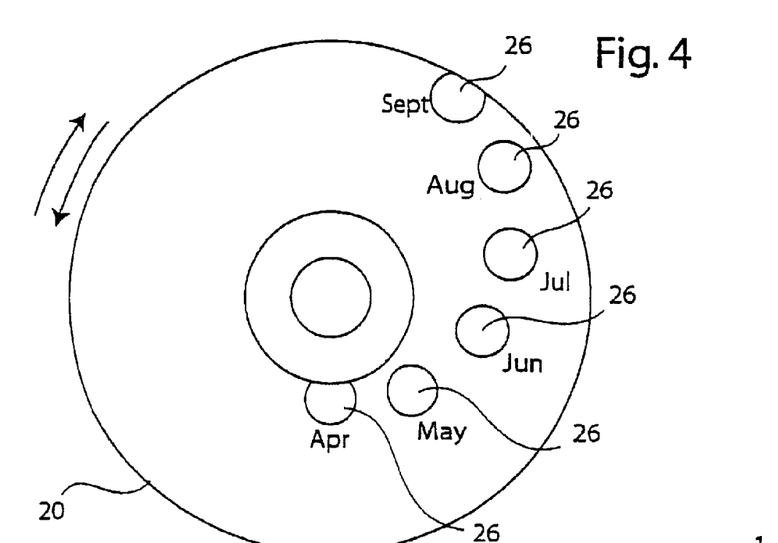
FIG. 4 shows a top view of the indicating member of the astronomical goniometric indicator of FIG. 3.
Figure 5:
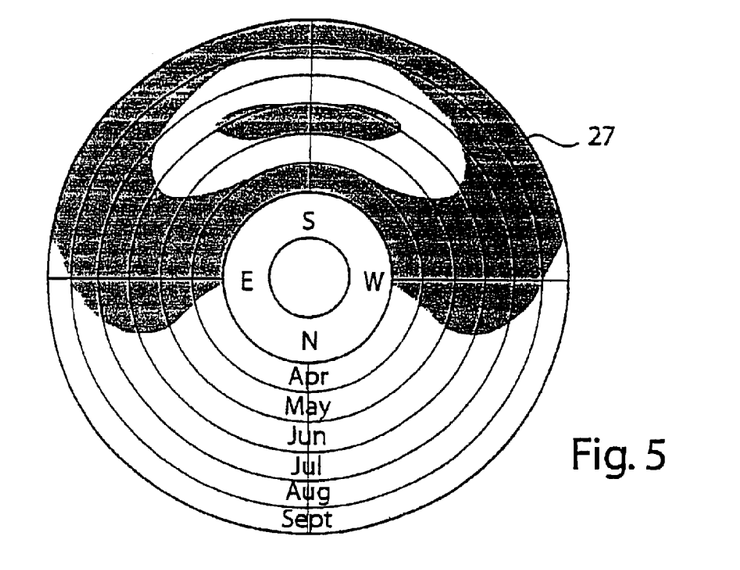
FIG. 5 shows a top view of the reflecting member of the astronomical goniometric indicator of FIG. 3.

By referring to FIGS. 3–5, it can be observed that a preferred embodiment of the solar goniometric indicator according to this invention comprises a transparent CD 20 which forms the reflecting member, provided with circular graphic signs 26, each one of which corresponds to a month of the year. The CD 20 is coaxially pivoted on an indicating disc 27 provided with a graduated scale which is similar to the one of the goniometric indicator of FIG. 2. Preferably, the upper part of the pivotal pin 28 of the CD20 on the indicating disc 27 is provided with a mirror 29.

The solar goniometric indicator 1 of FIGS. 3–5 allows an easier reading of the intensity index of the solar UV radiation. In fact, rotating the CD 20 is sufficient for orientating the same in such a way that the light diametral line formed by the Sun passes on the circular graphic sign 26 corresponding to the month of the year in which reading is carried out in order to read on the indicating disc the intensity index of the solar UV radiation.

Figure 6:
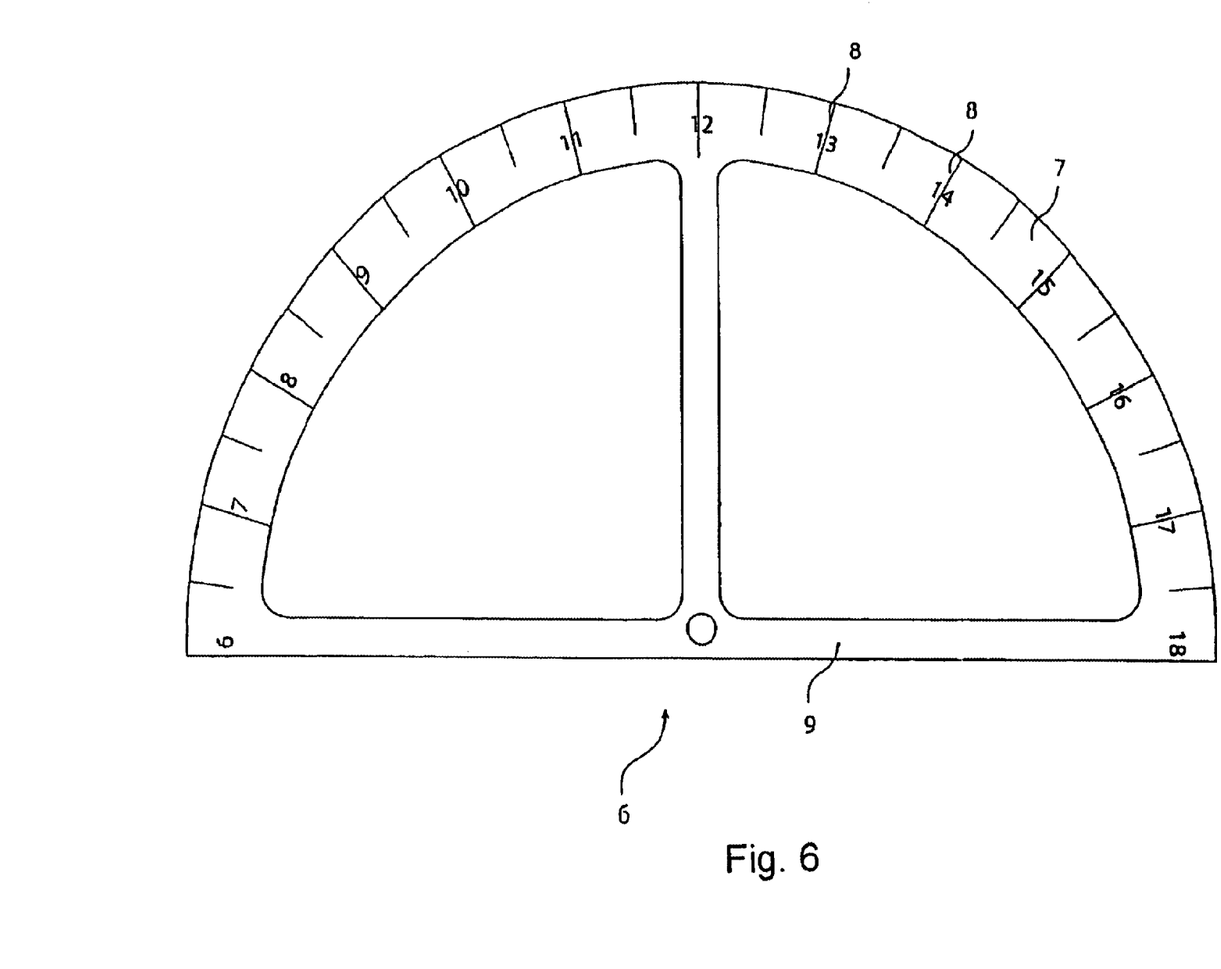
FIG. 6 shows the stationary member of a further preferred embodiment of the astronomical goniometric indicator according to this invention.
Figure 7:
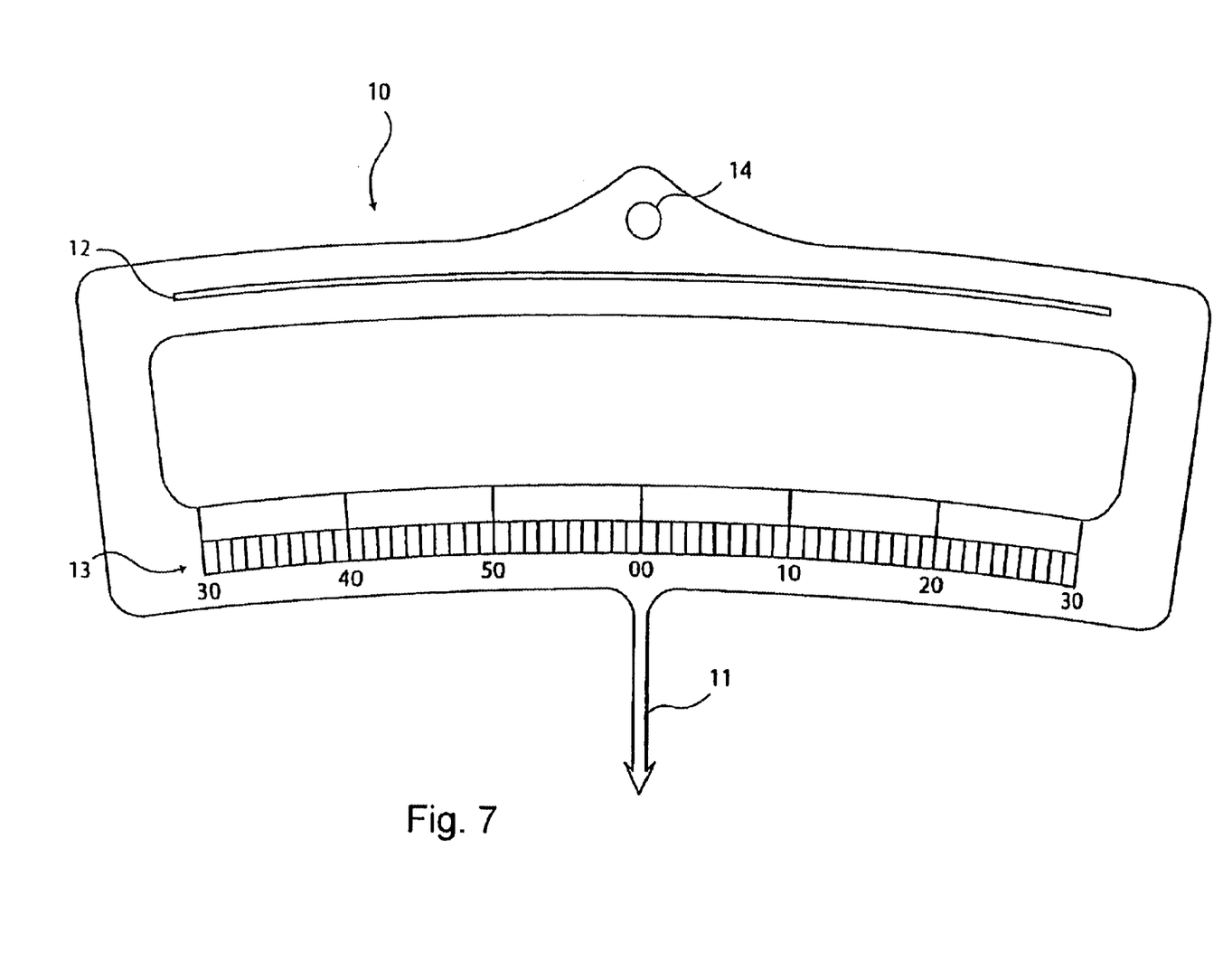
FIG. 7 shows the movable member of the astronomical goniometric indicator of FIG. 6.
Figure 8:
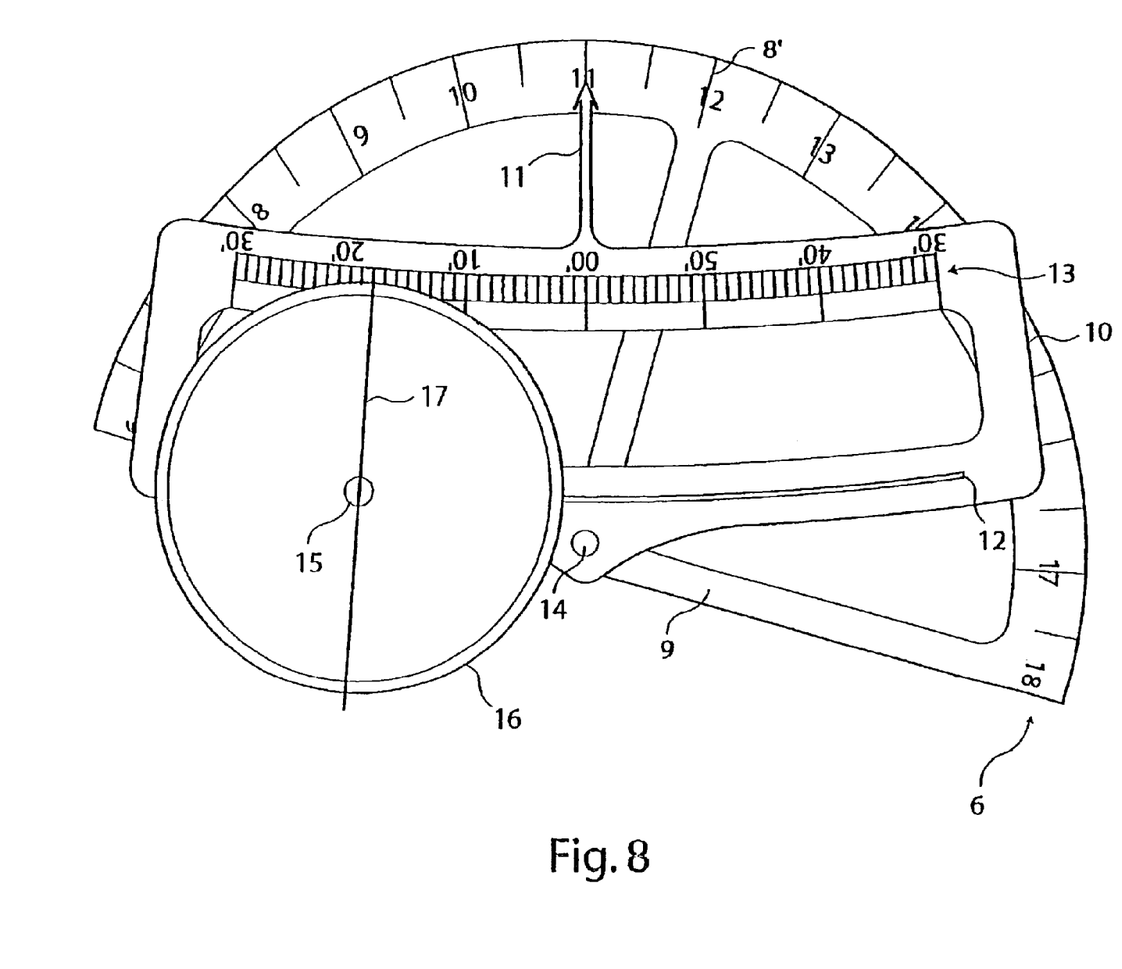
FIG. 8 shows the astronomical goniometric indicator corresponding to FIGS. 6 and 7.

By referring to FIGS. 6–8, it can be observed that a preferred embodiment of the solar goniometric indicator according to this invention comprises a suitable sense or reading amplifier including a stationary member 6 and a movable member 10, such as to enable a high time resolution read out to be carried out.

In particular, FIG. 6 shows a stationary member 6 of substantially semicircular shape, consisting of a semicircular arc 7, having graduation lines 8, each corresponding to a hour of the day, spaced apart by 15°, as well as a diametral base 9.

Movable member 10, substantially in the shape of a circular sector, preferably with a radius of 1 m is shown in FIG. 7. This movable member 10 comprises a pointer 11 positioned along the central radius of said circular sector as well as a slot 12 in the shape of a circumference arc having a width equal to 15° and a corresponding graduated scale 13 in the shape of a circumference arc subdivide into 60 segments. Lastly, said movable member 10 has a hole 14 corresponding to the central radius of said circular sector.

By referring to FIG. 8 the operation mode of the concerned solar goniometric indicator provided with a sense amplifier can be understood. Said movable member is fulcrumed, by means of said line 14, in the centre point of the diametral base 9 of the stationary member 6. Slot 12 is adapted to receive a pin 15 rigidly connected to a CD 16, having a diametral line 17. The above mentioned CD is oriented in a direction such that said diametral line 17 is arranged along a radius of the circular sector of stationary member 10. Said pin 15 can slide in said slot 12.

The time read out is carried out as follows:

the CD 16 should be exposed to the Sun light and said stationary member 6 (and, consequently, said movable member 10 and said CD 16) should be oriented in the equatorial plane, so as to align the central line 8' in the direction of the geographical South, so as to correspond to the 12 o'clock position;

movable member 10 should be rotated so as to align said pointer 11 to line 8 corresponding to the time at which the detection operation is carried out (in the example of FIG. 8, said pointer 11 indicates 11 o'clock);

CD 16 should be moved along said slot 12 up to a position in which the diametral light line formed by the Sun coincides with the diametral line 17;

the read out of the diametral line 17 on the graduated scale 13 furnishes the minute corresponding to the hour at the detection time (in the example of FIG. 8, diametral line 17 indicates minutes 18 and, therefore, the time read out is 11 hours 18 minutes).

Even though at each hour variation the movable member 10 ought to be rotated on the stationary member 6, it is apparent that also in this case the indicator shown in FIG. 8 can be immediately and easily read.

Figure 9:
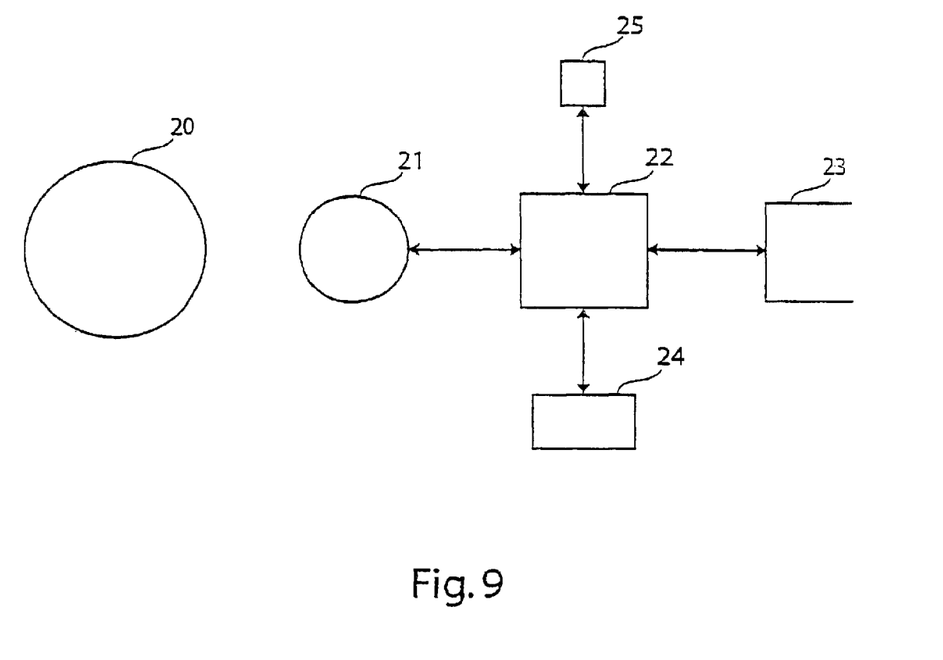
FIG. 9 shows a block diagram of a further preferred embodiment of the astronomical goniometric indicator according to this invention.

By referring now to FIG. 9, a further preferred embodiment of the solar goniometric indicator according to this invention can be observed, said indicator comprising a CD 20 provided with a sense electronic circuitry.

CD 20 is coupled to a detector 21 provided with optical sensors, preferably arranged along a circumferential line, adapted to detect the diametral line of light formed by the Sun on the CD. In particular, detector 21 is coupled to CD 20 in such a way as to let the latter be exposed to the Sun light.

Detector 21 is connected to a control and processor central electronic unit 22 that manages the indicator electronics and is adapted to process the angle included between the diametral line of light and a reference line. Said central electronic unit 22 is connected to a visualizer or display 23, that shows the hour indication and possibly one or more data items based upon the detection of the astronomical co-ordinates of the Sun. During the night time, the concerned indicator can still visualise the hour indication on said display 23 based upon a clock signal generated by a corresponding clock unit 24 coupled to said central electronic unit 22. Preferably, the concerned indicator also comprises a light intensity detector 25 that supplies said central electronic unit 22 with information relating to the solar light intensity level, based upon which said central unit 22 selects the data item to be visualised on display 23 between the signal generated by detector 21, upon processing it, and the clock signal generated by said clock unit.

CD 20 of indicator shown in FIG. 9 can equally be oriented either on the azimuthal plane or on the equatorial plane or on the vertical plane.

This invention has been particularly described in connection with a solar goniometric indicator. It should be understood, however, that the astronomical goniometric indicator according to this invention can also be utilised as a lunar goniometric indicator without so departing from the coverage of this invention.

The preferred embodiments of this invention have been described and a number of variations have been suggested hereinbefore, but it should expressly be understood that those skilled in the art can make other variations and changes, without so departing from the scope thereof, as defined by the annexed claims.

What is claimed is:

1. An astronomical, particularly solar and/or lunar, goniometric indicator comprising a reflecting member (1; 16; 20) and an indicating member (1; 16; 20; 27), the reflecting member (1; 16; 20) having at least one planar surface scored with substantially circular and concentric microgrooves, wherein the width and the depth of each microgroove and the distance between adjacent microgrooves are adapted to let a diametral line of diffracted and/or reflected light appear when said at least one planar surface is illuminated by a light source, the reflecting member (1; 16; 20) having at least one orientation graphic sign (2; 17; 26), the indicating member (1; 16; 20; 27) including at least one graduated scale.

2. An astronomical goniometric indicator according to claim 1, characterised in that said microgrooves form a planar coil or concentric circumferences.

3. An astronomical goniometric indicator according to claim 1, characterised in that said at least one orientation graphic sign is a line which is radial with respect to the microgrooves.

4. An astronomical goniometric indicator according to claim 1, characterised in that the reflecting member and the indicating member are incorporated in a single body.

5. An astronomical goniometric indicator according to claim 4, characterised in that at least one of said planar surfaces of said reflecting member is metallised.

6. An astronomical goniometric indicator according to claim 4, characterised in that said at least one graduated scale is placed on at least one corresponding planar surface of the reflecting member.

7. An astronomical goniometric indicator according to claim 4, characterised in that it further comprises a magnetic rod that is freely rotating when it is exposed to the magnetic field of the Earth.

8. An astronomical goniometric indicator according to claim 7, characterised in that it includes a graduated scale for detection of the magnetic declination of the Earth.

9. An astronomical goniometric indicator according to claim 7, characterised in that said reflecting member includes a metallised surface and a non-metallised surface, the latter having said magnetic rod rigidly connected thereto along a diameter of said reflecting member.

10. An astronomical goniometric indicator according to claim 1, characterised in that the reflecting member (20) is transparent and pivoted on the indicating member (27).

11. An astronomical goniometric indicator according to claim 10, characterised in that said at least one orientation graphic sign is a circle (26).

12. An astronomical goniometric indicator according to claim 1, characterised in that said at least one graduated scale comprises angular values (2, 17) and/or time values (3).

13. An astronomical goniometric indicator according to claim 12, characterised in that it is a solar goniometric indicator and in that said at least one graduated scale includes one or more curvilinear sectors (3) subdivided into one or more circular sectors.

14. An astronomical goniometric indicator according to claim 13, characterised in that each of said circular sectors indicates a period of the year.

15. An astronomical goniometric indicator according to claim 14, characterised in that each of said circular sectors indicates a month of the year.

16. An astronomical goniometric indicator according to claim 15, characterised in that said at least one graduated scale includes six circular sectors indicating months of the year.

17. An astronomical goniometric indicator according to claim 13, characterised in that each of said curvilinear sectors (3) indicates a number of hours to the sunset.

18. An astronomical goniometric indicator according to claim 13, characterised in that each of said curvilinear sectors (3) indicates an intensity value or an intensity index of the UV solar radiation.

19. An astronomical goniometric indicator according to claim 1, characterised in that said reflecting member is a disc.

20. An astronomical goniometric indicator according to claim 19, characterised in that said reflecting member is a Compact Disc (CD) (1; 16; 20).

21. An astronomical goniometric indicator according to claim 1, characterised in that said indicating member (1; 16; 20; 27) is substantially a parallelepiped and in that each of the six sides of the parallelepiped has a planar metallised surface.

22. An astronomical goniometric indicator according to claim 21, characterised in that said indicating member is a cube.

23. An astronomical goniometric indicator according to claim 21, characterised in that each side includes a graduated scale comprising two circular sectors each of which indicates a month of the year.

24. An astronomical goniometric indicator according to claim 1, characterised in that it further comprises at least one reading amplifier, having a stationary member (6) and a movable member (10) pivotally associated thereto, said stationary member (6) having a first graduated scale extending along a first circumference arc whose centre point coincides with the pivotal axis, said movable member (10) having a second graduated scale (13) extending along a second circumference arc as well as mechanical guide means (12) adapted to be coupled to said reflecting member (1; 16; 20) so as to let it move along a circumference arc corresponding to said second circumference arc.

25. An astronomical goniometric indicator according to claim 24, characterised in that said first circumference arc has a width equal to 180° and said second circumference arc has a radius equal to 1' m and a width equal to 15°.

26. An astronomical goniometric indicator according to claim 24, characterised in that said mechanical guide means include a circumference arc shaped slot (12) adapted to receive a pin (15) rigidly connected to said reflecting member (16).

27. An astronomical goniometric indicator according to claim 24, characterised in that it further comprises optical detector means (21) rigidly connected to said reflecting member and adapted to detect a light signal generated by at least one planar metallised surface and to furnish the detected light signal to electronic control and processor means (22), said electronic control and processor means (22) being connected to display means (23).

28. An astronomical goniometric indicator according to claim 27, characterised in that it further comprises first electromechanical means controlled by said electronic control and processor means (22), adapted to rotate said movable member (10) with respect to said stationary member (6), as well as second electromechanical means controlled by said electronic control and processor means (22), adapted to move said reflecting member (1; 16; 20) along the circumference arc allowed by said mechanical guide means.

29. An astronomical goniometric indicator according to claim 27, characterised in that it further comprises electronic clock means (24) adapted to furnish a clock signal to said electronic control and processor means (22).

30. An astronomical goniometric indicator according to claim 27, characterised in that it also comprises further light intensity detector means (25) coupled to said electronic control and processor means (22).

* * * * *